(12) United States Patent
Zhao et al.

(10) Patent No.: US 8,050,284 B2
(45) Date of Patent: Nov. 1, 2011

(54) METHOD, DEVICE AND COMMUNICATION EQUIPMENT FOR CONTROLLING A BURST ASSEMBLY

(75) Inventors: Lu Zhao, Chengdu (CN); Sheng Wang, Chengdu (CN); Shizhong Xu, Chengdu (CN); Yi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 12/464,521

(22) Filed: May 12, 2009

(65) Prior Publication Data

US 2009/0220238 A1    Sep. 3, 2009

Related U.S. Application Data

(63) Continuation of application No. PCT/CN2007/070663, filed on Sep. 10, 2007.

(30) Foreign Application Priority Data

Dec. 30, 2006    (CN) .......................... 2006 1 0064657

(51) Int. Cl.
    *H04L 12/56*    (2006.01)
(52) U.S. Cl. ..................................... 370/412; 370/395.7
(58) Field of Classification Search ............. 370/395.21, 370/395.4, 395.41, 395.42, 395.43, 412, 370/414, 415, 395.7, 537
    See application file for complete search history.

(56) References Cited

U.S. PATENT DOCUMENTS

| 4,100,377 | A | * | 7/1978 | Flanagan | ....................... 370/435 |
| 2003/0099243 | A1 | | 5/2003 | Oh et al. | |
| 2003/0223405 | A1 | * | 12/2003 | El-Bawab | ..................... 370/352 |
| 2004/0022248 | A1 | | 2/2004 | Yuang et al. | |
| 2009/0142055 | A1 | * | 6/2009 | Qiu et al. | ......................... 398/45 |

FOREIGN PATENT DOCUMENTS

| CN | 1601995 A | 3/2005 |
| CN | 101212389 B | 6/2010 |

OTHER PUBLICATIONS

Bi et al., "A Study of an Improved Adaptive Burst Assembly Mechanism," *Optical Communication Technology*, 6:31-33 (Jun. 2005).

(Continued)

*Primary Examiner* — Hassan Phillips
*Assistant Examiner* — Saba Tsegaye
(74) *Attorney, Agent, or Firm* — Leydig, Voit & Mayer, Ltd.

(57) ABSTRACT

A method for controlling burst assembly, device, and communication equipment thereof are provided. In the present invention, an assembly time and a predetermined time threshold are compared to determine a load change in a cache queue. If the load is increased or decreased suddenly, a length threshold is directly increased or decreased. If the load is to be increased, the length threshold is randomly increased according to a certain probability. If the load is to be decreased, the length threshold is randomly decreased according to a certain probability. If the load is in a normal state, the length threshold is maintained. Therefore, the length threshold is dynamically adjusted with the load change. The method and device provided by the present invention ensure an end-to-end (E2E) delay of the services and optimize the network performance.

15 Claims, 7 Drawing Sheets

OTHER PUBLICATIONS

Cao et al., "Assembling TCP IP Packets in Optical Burst Switched Networks," *Globecom '02*, 3:2808-2812 (Nov. 21, 2002).

Wu et al., "Modifying the Adaptive Assembly Algorithm Based on the Length Threshold," *Journal on Communications*, 27(4):37-41 (Apr. 2006).

Written Opinion of the International Searching Authority in corresponding PCT Application No. PCT/CN2007/070663 (Dec. 20, 2007).

Ge et al., "Optical Burst Switching and Self-Similar Traffic," IEEE Communications Letters, Mar. 2000, vol. 4, No. 3, Institute of Electrical and Electronic Engineers, Piscataway, New Jersey.

Li et al., "A Study of Adaptive Burst Assembly Mechanism in Optical Burst Switch Networks," Lab of Optical fiber Communications, 2003, SPIE—The International Society of Optics and Photonics, Bellingham, Washington.

Oh et al., "A Data Burst Assembly Algorithm in Optical Burst Switching Networks," ETRI Journal, Aug. 2002, vol. 24, No. 4, ETRI, Daejeon, Korea.

Qiao et al., "Optical Burst Switching (OBS)—A New Paradigm for an Optical Internet," Lab for Advanced Network Design, Evaluation, and Research (LANDER), SUNY Buffalo, Buffalo, New York.

Taqqu et al., "Proof of a Fundamental Result in Self-Similar Traffic Modeling," Department of Mathematics, Boston University, Boston, Massachusetts.

Uengsakul et al., "Performance Evaluation of Assembly Mechanisms for Jet-based Optical Burst Switching Networks," Telecommunication Program, Asian Institute of Technology, 2004, Institute of Electrical and Electronic Engineers, Pathumthani, Thailand.

Vokkarane et al., "Threshold-Based Burst Assembly Policies for Qos Support in Optical Burst-Switched Networks," Center for Advanced Telecommunications Systems and Services, University of Texas at Dallas, Richardson, Texas.

Xiong et al., "Control Architecture in Optical Burst-Switched WDM Networks," IEEE Journal on Selected Areas in Communications, Oct. 2000, vol. 18, No. 10, Institute of Electrical and Electronic Engineers, Piscataway, New Jersey.

* cited by examiner

METHOD, DEVICE AND COMMUNICATION EQUIPMENT FOR CONTROLLING A BURST ASSEMBLY

CROSS-REFERENCE TO RELATED APPLICATIONS

This application is a continuation of International Patent Application No. PCT/CN2007/070663, filed Sep. 10, 2007, which claims priority to Chinese Patent Application No. 200610064657.X, filed Dec. 30, 2006, both of which are hereby incorporated by reference in their entirety.

FIELD OF THE TECHNOLOGY

The present invention relates to the field of communication, and more particularly to a method, device, and communication equipment for controlling a burst assembly.

BACKGROUND

With the rapid development of Internet services and the diversity and variability of emerging services (such as web browsing, multimedia services, resource downloading, and network conference services), conventional core switching networks have already lagged behind the requirements of users. Therefore, in order to keep pace with the explosive growth of Internet traffic, the increasing demand on bandwidth, and the diversity and burst characteristic of the services, researchers devote themselves to the study of wavelength division multiplexing (WDM) and even dense wavelength division multiplexing (DWDM) transmission. At present, the DWDM technology is able to raise the transmission bandwidth to about 10 Tbit/s, thus meeting the requirement on the bandwidth of a transport network in a long term. As a network switching node needs to convert transmitted data from an optical domain to an electrical domain and then back to the optical domain, the integrated circuit (IC) technology has become a bottleneck that restricts the node processing capability in an optical network. Though the network bandwidth is large enough, the network transmission rate is still limited. Thereby, an optical switching technology emerges as required, i.e., the whole conversion is completed in the optical domain.

Currently, the optical network adopts optical circuit switching (OCS), which is simple in protocol, mature in technology, and easy to implement. OCS is similar to circuit switching, and is connection-oriented, so as to establish a transmission optical path for end-to-end (E2E) traffic flow. However, due to the changeability and burst characteristic of the Internet services, the establishment and release of the optical path are quite frequent. Thus, on account of the dramatic contrast between the overhead of the establishment and maintenance of the optical path and the duration of the optical path connection (usually very short), the bandwidth utilization is rather low.

Optical packet switching (OPS) is a switching mechanism of fine granularity. Similar to conventional packet switching networks, the OPS also adopts a store-and-forward technology. As OPS allows the statistics and multiplexing of network channel bandwidth resources, it is particularly suitable for burst Internet data services. Therefore, OPS is quite promising in the long run. However, currently some problems difficult to handle still exist. First of all, the optical switch technology capable of effectively supporting the OPS is not mature, and meanwhile the switching speed of an optical switching matrix is far from meeting the requirement. Secondly, it is also difficult to perform packet synchronization at the entry of a switch, and thus the conflict between the packets cannot be effectively decreased. Finally, a random access mechanism in essence has not been proposed yet for the optical domain, and the current optical domain cache may only be realized through fibre delay lines (FDLs). The use of the FDLs is also limited by the signal quality and physical space, and may not provide sufficiently flexible and adequate cache. In view of the above, the OPS still needs to be studied for many years before being utilized.

Optical burst switching (OBS) is proposed as a compromise solution between OCS and OPS. Packets arriving at edge nodes in an OBS network are assembled into burst packets according to destination address and quality of service (QoS) for later transmission and switching. Therefore, the processing granularity is improved. Each burst packet is corresponding to a burst header packet (BHP). The BHP enters a core switching network before burst packets, and reserves resources hop by hop at all intermediate nodes that the burst packets need to pass by. As long as an offset time between the burst packets and the BHP is properly set, it is ensured that before corresponding burst packets arrive at each intermediate node, the processing of the BHP and the configuration of the corresponding switching channels have already been completed, thereby realizing E2E all-optical transparent transmission of the burst packets. Compared with the OCS, the OBS has a moderate switching granularity, and allows the statistics and multiplexing, thereby raising the resource utilization. Compared with the OPS, the OBS is easier to implement, and has a lower requirement for the components. Therefore, though the OBS is immature in terms of standard and protocol, under continuous research and development, it is likely to become a core technology for optical transmission and switching network in the next generation.

Figure 1:
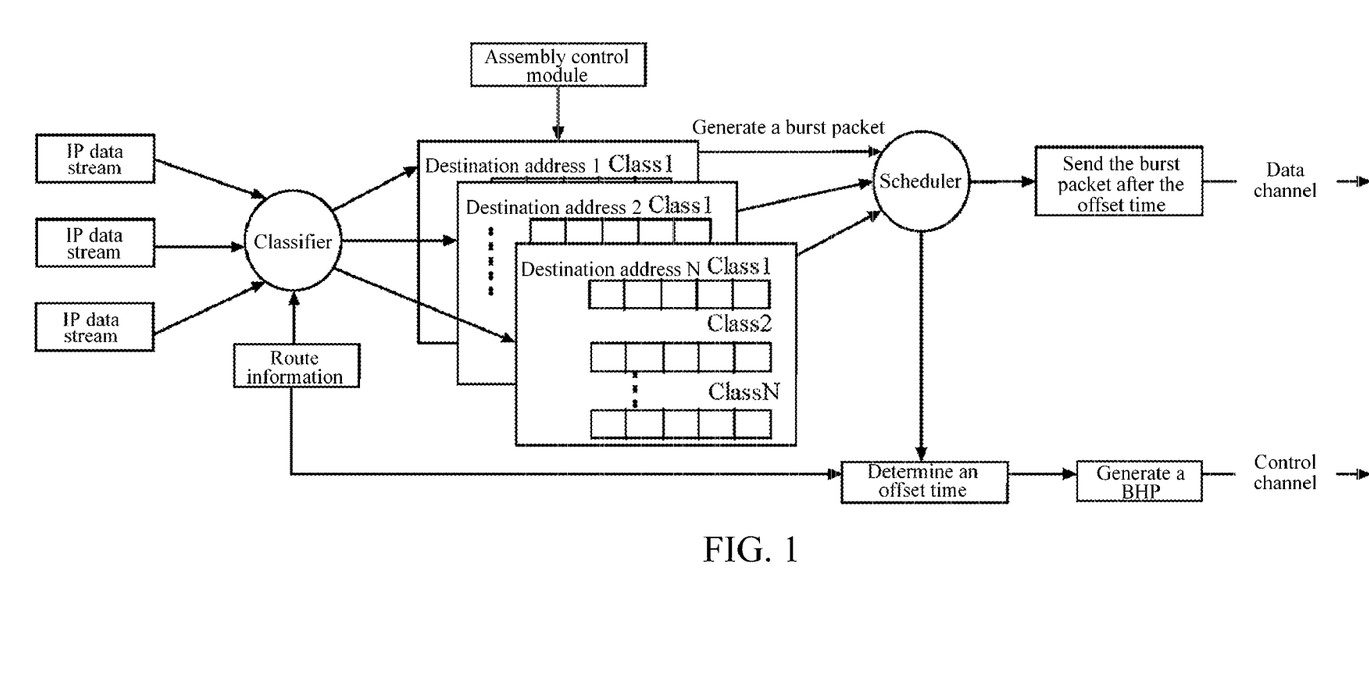
FIG. 1 is a schematic view showing the assembly of IP packets into burst packets at edge nodes in an OBS network.

Burst assembly is critical to the design of the OBS network, which greatly affects the performance of the OBS network. FIG. 1 is a schematic view showing the assembly of IP packets into burst packets at edge nodes in an OBS network in the conventional art. Referring to FIG. 1, after arriving at the edge nodes in the OBS network, multiple IP packets are classified according to the destination address and priority thereof, and then sent to corresponding assembly queues. When triggering conditions for assembly are satisfied, the IP packets in the corresponding queues are assembled into a burst packet, then scheduled, and sent to an OBS core network for transmission.

The burst assembly method adopted by the edge nodes in the OBS network determines the triggering conditions for assembly, and meanwhile determines the characteristics of the output burst packets, thereby directly affecting the length of the burst packets, packet lost rate of the burst packets in transmission, E2E delay of the IP data packets, and utilization of the network channels. Therefore, a desired burst assembly method may effectively control the E2E delay of the packets, meet the delay requirements of the services, raise the resource utilization in the OBS network, and decrease the packet lost rate.

Currently, three burst assembly methods are disclosed in the conventional art, which are an assembly method based on a fixed time threshold, an assembly method based on a fixed length threshold, and a threshold adaptive assembly method. These methods are respectively introduced as follows.

A burst assembly method based on a fixed time threshold is disclosed in the conventional art. The basic principle of the method is that, a maximum waiting time T is set for each cache queue, and IP data packets arriving within the time T are cached in corresponding assembly queues. A timer starts timing from a first IP packet entering the cache queue, and when reaching the time T, all the data packets in the corresponding queues are assembled into a burst packet. On account of the blocking of control channels, utilization of the channels, and processing speed of core nodes in an OBS network, the length of the burst packet should have a lower limit, and thus the method further restricts a minimum length of the burst packet. If the assembly time reaches the maximum waiting time T while the burst packet length is inadequate, the packet has to be filled to the minimum length and transmitted later. This method is advantageous in that the E2E delay of the IP data packets can be controlled accurately.

Seen from the above, the burst assembly method based on a fixed time threshold has the following disadvantages.

First, when a certain assembly queue is under a low load, a large amount of data will be filled, and thus the utilization of the burst packet is decreased. When the load is high, a great many data packets will arrive during the assembly, and thus the assembly queue requires plenty of cache. Besides, an extremely long burst packet may also lead to the increase of the packet lost rate. The reason is that, when a conflict occurs, the loss of one burst packet means the loss of plenty of IP packets. In addition, with dynamic changes of the load, the length variations of the burst packets are great, which may affect the network performance.

Figure 2:
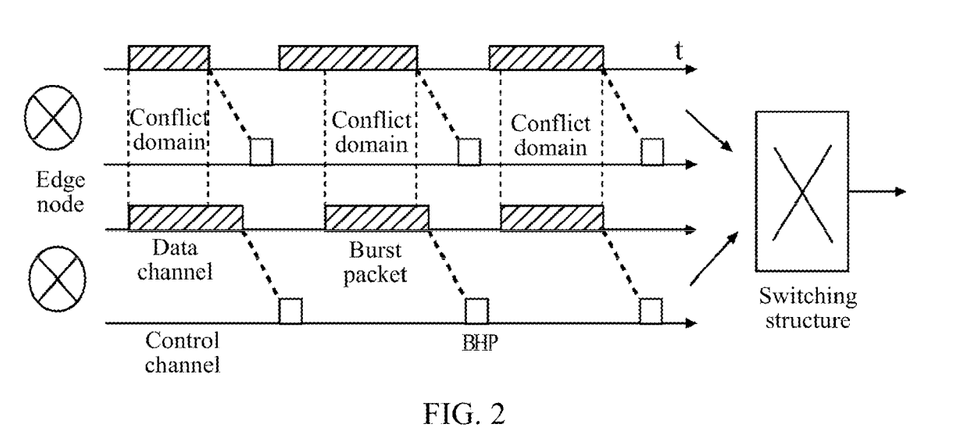
FIG. 2 is a schematic view showing continuous conflicts caused by assembly synchronization at the edge nodes of the OBS network.

Secondly, when each edge node adopts the same time threshold, each assembly queue periodically generates burst packets. FIG. 2 is a schematic view showing continuous conflicts caused by assembly synchronization at the edge nodes. In FIG. 2, as each assembly queue at the edge node periodically generates burst packets, assembly synchronization occurs between the burst packets, thereby resulting in continuous resource competitions at an egress of a switching structure of the edge node and the core node. At the edge node, packet loss may be avoided through cache, but an additional cache delay may be generated. However, at the core node, due to the lack of optical cache, a large amount of packet loss may be caused continuously, and the channel resources may not be fully utilized.

A burst assembly method based on a fixed length threshold is disclosed in the conventional art. The basic principle of the method is that, a fixed length threshold is set for each assembly queue, and arriving data packets are still sent to corresponding assembly queues for cache. When a total length of the data packets in the cache queues reaches a length threshold, all the data packets in the corresponding queues are assembled into a burst packet. The method is advantageous in that the burst packet length is relatively fixed, which may improve the network performance, optimize the scheduling, and avoid assembly synchronization to some extent. Compared with the burst assembly method based on a fixed time threshold, the method based on a fixed length threshold is advantageous in decreasing the packet lost rate.

However, the burst assembly method based on a fixed length threshold still has the following disadvantages.

First, when a traffic load is low, this method may cause a great assembly delay, and is thus inapplicable to real-time service transmission. An advanced technical solution is also provided in the conventional art, i.e., a time threshold is added to limit the delay, so that the assembly is completed when either of the two thresholds is reached. That is to say, the assembly based on a fixed time threshold is adopted under a low load, and the assembly based on a fixed length threshold is adopted under a high load. This advanced method integrates two thresholds, but still has limited adaptability to the change of the traffic, and the blocking of burst packets caused by assembly synchronization still exists at a low load.

Secondly, when the load is high, a generation period of the burst packets is short. If the length threshold is set too small, plenty of BHPs may flood into the control channel in a short time, thus resulting in the blocking of the control channel. Moreover, due to dynamic changes of the network load, it is difficult to predetermine an optimal length threshold in practice, and thus the delay problem caused by the method is obvious.

In order to enable the assembly threshold to vary with the dynamic changes of the traffic load, a threshold adaptive burst assembly method is further disclosed in the conventional art. The basic principle of the method is to adopt a prolonged length threshold and a fixed time threshold. The fixed time threshold is set to ensure a maximum tolerable delay under a low load, and the prolonged length threshold is set for adjustment according to the current load condition. Moreover, in order to decrease the continuous dramatic changes of the burst packet length, this solution introduces a hysteresis change characteristic, that is, after each assembly is completed, the burst packet length of this assembly is compared to obtain the latest load condition. If it is ensured that the traffic does change through several comparisons, the length threshold is adjusted.

Seen from the above, the threshold adaptive burst assembly method has the following disadvantages.

First, in this method, if the length threshold triggers an assembly, the load will be increased, and thus the length threshold needs to be enlarged. This inappropriate load balancing method may result in an ever increasing length threshold till the time taken to complete the assembly under the current load reaches the fixed time threshold, or the length threshold reaches a predetermined tolerable maximum value, which may cause an unnecessary increase in the assembly delay. Moreover, the judging whether the load changes or not actually depends on the length of the IP packet that enters the queue last to trigger the assembly. The load determination mode adopted by this method cannot be well adapted to the change of the load.

Secondly, though the assembly length threshold is set to change with the load, this method does not clearly state in what relation the two may match up with each other, i.e., the objective of the adaptability is not explicit.

Thirdly, this method introduces the hysteresis change characteristic, so that the assembly threshold is adjusted after it is ensured that the load changes through several comparisons, thereby decreasing the continuous dramatic changes of the length threshold to some extent. However, in this manner, the tracking ability of the length threshold on the burst is also decreased, i.e., the adaptability of this method is lowered.

SUMMARY

The embodiments of the present invention provide a method for controlling burst assembly, corresponding device and communication equipment so as to ensure an end-to-end (E2E) delay of the services and optimize the network performance.

A method for controlling burst assembly includes: (1) judging whether a data packet cache time in a cache queue reaches a predetermined maximum assembly delay or not, and/or judging whether a total length of data packets in the cache queue reaches a current length threshold or not, and assembling all the data packets in the cache queue into a burst packet to be sent out if either of two judgment conditions is satisfied; and (2) comparing an assembly time with a predetermined time threshold and determining a load change trend in the cache queue: (a) if the load is to be increased, judging whether the number of the continuous times that the length threshold is not increased when the load is to be increased is greater than or equal to a predetermined value, and if the number of the continuous times that the length threshold is not increased is greater than or equal to the predetermined value, increasing the length threshold; and (b) if the load is to be decreased, judging whether continuous times that the length threshold is not decreased when the load is to be decreased is greater than or equal to a predetermined value, and if the number of the continuous times that the length threshold is not decreased is greater than or equal to the predetermined value, decreasing the length threshold.

An embodiment of the present invention further discloses a device for controlling assembly, including: (1) a timer, adapted to time a cache time for data packets in a cache queue, and send a trigger assembly signal to the cache queue when the cache time reaches a predetermined maximum assembly delay so as to instruct the cache queue to assemble all the data packets into a burst packet to be sent out; (2) a length threshold setting module, adapted to set and store a current length threshold, and send a trigger assembly signal to the cache queue when a queue length reported by the cache queue reaches the current length threshold to instruct the cache queue to assemble all the data packets into a burst packet to be sent out; and (3) a length threshold adjustment module, adapted to compare an assembly time reported by the timer with a predetermined time threshold and determine a load change trend in the cache queue: (a) if the load is to be increased and the number of the continuous times that the length threshold is not increased when the load is to be increased is greater than or equal to a predetermined value, increasing, by the length threshold adjustment module, the length threshold and instructing the length threshold setting module to update the current length threshold; and (b) if the load is to be decreased and the number of the continuous times that the length threshold is not decreased when the load is to be decreased is greater than or equal to a predetermined value, decreasing, by the length threshold adjustment module, the length threshold and instructing the length threshold setting module to update the current length threshold.

Correspondingly, an embodiment of the present invention further discloses communication equipment serving as an edge node in an optical burst network. The equipment includes a data packet classifier, a plurality of cache queues, a plurality of devices for controlling assembly, and a scheduling module, in which (1) the data packet classifier classifies data packets according to destination addresses and/or priorities thereof and sends the data packets to corresponding cache queues; (2) the cache queues update current queue length after receiving the data packets, and send the current queue length to corresponding devices for controlling assembly; (3) the devices for controlling assembly control whether to assemble the data packets in the cache queues into burst packets to be sent out according to a predetermined maximum assembly delay and a current length threshold, compare an assembly time with a predetermined time threshold, and determine load change trends in the cache queues: (a) if loads are to be increased and the number of the continuous times that the length threshold is not increased when the loads are to be increased is greater than or equal to a predetermined value, the devices for controlling assembly increase the length threshold and update the current length threshold; and (b) if loads are to be decreased, and the number of the continuous times that the length threshold is not decreased when the loads are to be decreased is greater than or equal to a predetermined value, the devices for controlling assembly decrease the length threshold and update the current length threshold; and (c) the scheduling module adopts a scheduling strategy to schedule the burst packets sent by the cache queues to appropriate channels for transmission.

Seen from the above description of the technical solutions of the present invention, the time taken for completing the assembly is used as a basis to determine the load change, and a threshold adjustment mechanism is adopted according to the trend of the load change. When the load slightly changes, it is determined randomly whether to adjust the length threshold or not through cumulative probability so as to avoid a dramatic continuous change of the length threshold. Further, in the case of a load burst, a fast reaction is made to adjust the length threshold in time.

Compared with the assembly method based on a fixed time threshold, the technical solutions of the embodiments in the present invention better ensure the E2E delay, meanwhile decrease the data padding ratio under a low load, and improve the utilization of the burst packets. Further, the technical solutions according to the embodiments of the present invention employ a random adjustment mechanism for the length threshold so as to effectively limit the cache usage and burst packet length under a high load, and further decrease occur of assembly synchronization, thereby improving the packet lost rate.

Compared with the assembly method based on a fixed length threshold, in the technical solutions according to the embodiments of the present invention, when the load slightly changes, the hysteresis adjustment characteristic of the length threshold is randomly adjusted according to a probability corresponding to the unadjusted continuous times so as to effectively stabilize the burst packet length and decrease the delay variation caused by frequent adjustments of the length threshold. Meanwhile, the technical solutions according to the embodiments of the present invention may effectively control the assembly delay under a low load, and increase the length threshold under a high load, thereby preventing the burst packets from being generated too fast to some extent so as not to cause the blocking of the control channels.

DETAILED DESCRIPTION OF THE EMBODIMENTS

In order to make the objectives, technical solutions, and advantages of the present invention comprehensible, embodiments accompanied with figures are described in detail below.

Though the burst assembly methods disclosed in the conventional art have their individual advantages, they all have obvious defects, and may not cover all the required functions on the improvement of the network performance. Besides, the existing adaptive burst assembly method also has obvious defects, and has limited adaptability due to the adopted strategy for estimating the traffic load change and the corresponding length threshold adjustment solution.

The method for controlling burst assembly provided in an embodiment of the present invention is actually an adaptive assembly mechanism based on a dynamic length threshold, and can be applied to each assembly queue. The present invention mainly compares an assembly time with a predetermined time threshold to determine the trend of a traffic load change in the cache queue, and adjusts the length threshold according to the trend of the traffic load change, thereby achieving a stable delay and optimizing the network performance. Before describing in detail the burst assembly method of the present invention, some necessary illustration of the time threshold in the embodiment of the present invention is provided below.

In the embodiments of the present invention, the predetermined time threshold includes four time points as follows.

(1) MAX_TA: a maximum assembly delay. This time point is a maximum assembly delay that may appear in the network, and may serve as a time threshold for determining that the load is decreased suddenly.

(2) MIN_TA: a minimum assembly delay. This time point serves as a time threshold for determining that the load is increased suddenly, and in practice the delay in some assembly process may be smaller than this value.

(3) LOW_TA: a tolerable minimum assembly delay. This value is determined according to E2E delay requirements of the services, and different values may be determined for different services.

(4) UP_TA: a tolerable maximum assembly delay. This value is also determined according to E2E delay requirements of the services, and different values may be determined for different services.

Figure 3:
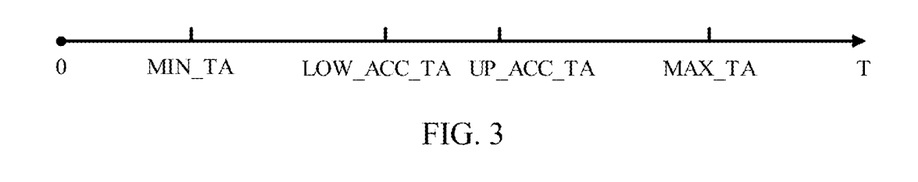
FIG. 3 is a schematic view of a predetermined time threshold according to an embodiment of the present invention.

FIG. 3 is a schematic view of a predetermined time threshold according to the embodiments of the present invention. In FIG. 3, an assembly time axis is divided into four intervals by the above four time points. When the assembly time falls in different intervals, a trend of the traffic load change in the cache queue can be determined, and thus the length threshold is adjusted according to different trends of the change.

Figure 4:
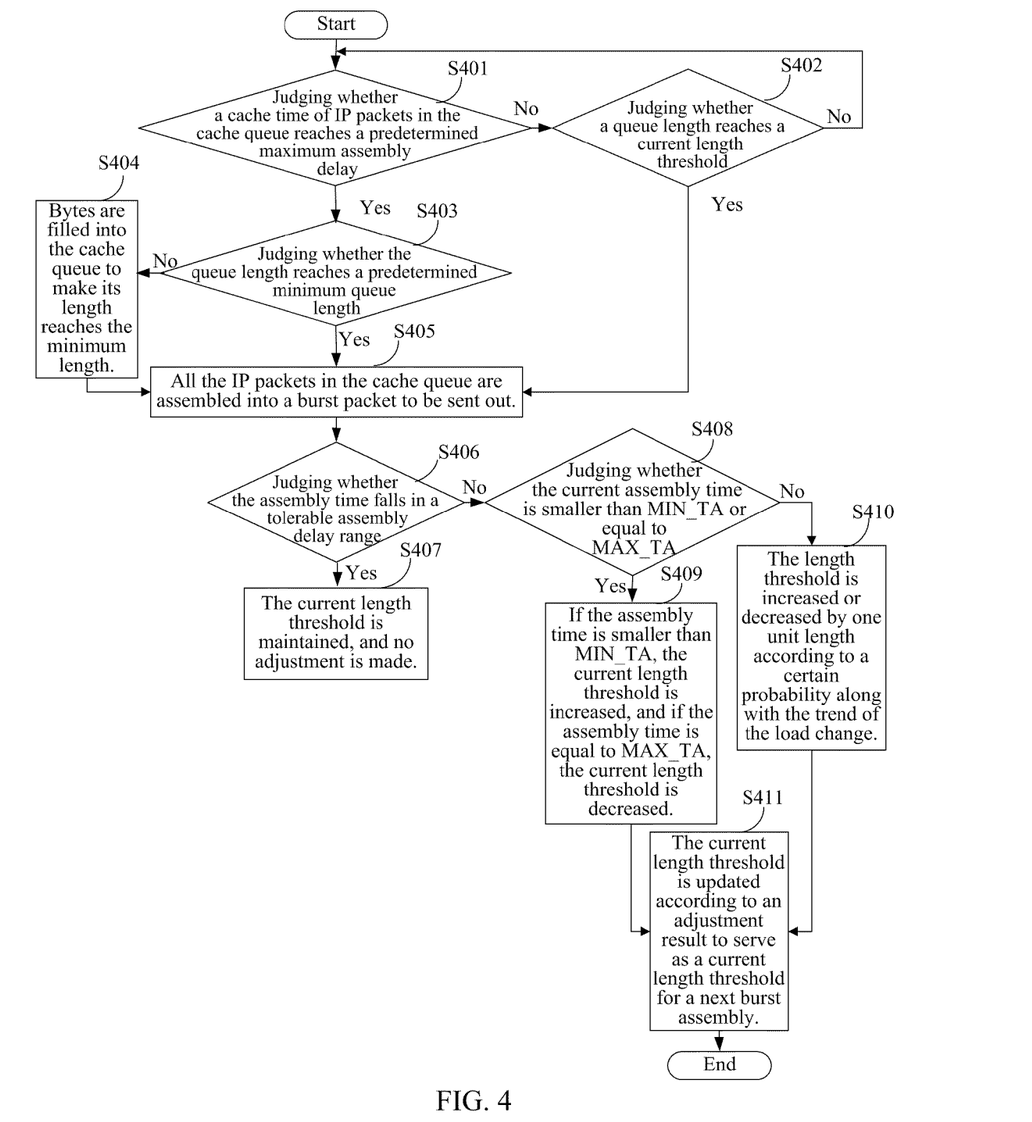
FIG. 4 is a schematic flow chart of the method for controlling burst assembly according to an embodiment of the present invention.

FIG. 4 is a schematic flow chart of a method for controlling burst assembly according to an embodiment of the present invention. The method includes the following steps:

In Step S401, it starts timing after a burst assembly is completed, and it is also judged whether cache time of IP packets in the cache queue reaches the predetermined maximum assembly delay MAX_TA. If the cache time of IP packets in the cache queue reaches the MAX_TA, Step S403 is performed; otherwise, Step S402 is performed.

In Step S402, the current queue length is calculated, i.e., a total length of all the IP packets in the cache queue, and it is judged whether the queue length reaches a current length threshold. If the queue length reaches the current length threshold, Step S405 is performed; otherwise, return to Step S401.

In Step S403, it is judged whether the queue length reaches a predetermined minimum queue length, and if the queue length reaches the predetermined minimum queue length, Step S405 is performed; otherwise, Step S404 is performed.

In Step S404, bytes are filled into the cache queue to enable the total length of all the IP packets to reach the predetermined minimum length.

In Step S405, all the IP packets in the cache queue are assembled into a burst packet to be sent out, and then Step S406 is performed.

In Step S406, it is judged whether the assembly time falls in a tolerable assembly delay range, i.e., whether the current assembly time falls in an interval of (LOW_TA, UP_TA), and if the current assembly time falls in the interval of (LOW_TA, UP_TA), Step S407 is performed; otherwise, Step 408 is performed.

In Step S407, the current length threshold is maintained and no adjustment will be made to the length threshold.

In this step, if the current assembly time falls in a tolerable assembly delay range, it is considered that the load in the current cache queue does not change too much, and the current length threshold can satisfy the requirements of the services on the network performance so that no adjustment is needed.

In Step S408, it is judged whether the current assembly time falls in an interval of (0, MIN_TA) or equal to MAX_TA, and if the current assembly time falls in an interval of (0, MIN_TA) or equal to MAX_TA, Step S409 is performed; otherwise, Step S410 is performed.

In Step S409, if the current assembly time is smaller than MIN_TA, the length threshold is increased according to a predetermined unit length; if the current assembly time is equal to MAX_TA, the length threshold is decreased according to the predetermined unit length, and then Step S411 is performed.

In this step, if the assembly time falls in an interval of (0, MIN_TA), or reaches MAX_TA, it indicates that the assembly time changes abruptly and a load burst appears. Thereby, the length threshold needs to be increased or decreased immediately according to the predetermined unit length so that the length threshold can be accommodated to the load change and the delay resulted from the assembly can be stabilized.

In Step S410, if it is determined that the assembly time falls in an interval of (MIN_TA, MAX_TA) but outside the interval of (LOW_TA, UP_TA), the length threshold is randomly increased or decreased by one unit length according to a certain probability along with the trend of the load change.

If the assembly time falls in the interval of (MIN_TA, MAX_TA) but outside the interval of (LOW_TA, UP_TA), it is determined that the load is to be increased or decreased while the burst of the load change is not high. Thereby, the threshold length may be randomly adjusted according to a certain probability.

Two cases are illustrated in detail below with examples.

When the assembly time falls in an interval of (MIN_TA, LOW_TA), it indicates that the load is to be increased, and thus the length threshold may be randomly added by one unit length according to a certain probability. Here, the value of the probability is determined by continuous times that the length threshold is not increased when the assembly time falls in the interval of (MIN_TA, LOW_TA). If it is predetermined that the assembly time falls in the interval of (MIN_TA, LOW_TA) and the continuous times that the length threshold is not increased is equal to a certain value, the probability for randomly increasing the length threshold is 1. As the continuous times is increased from 0 to a predetermined value, the probability that the length threshold is added by one unit length is correspondingly increased from 0 to 1.

When the assembly time falls in an interval of (UP_TA, MAX_TA), it indicates that the load is to be decreased, and thus the length threshold may be randomly decreased by one unit length according to a certain probability. Here, the value of the probability is determined by continuous times that the length threshold is not decreased when the assembly time falls in the interval of (UP_TA, MAX_TA). If it is predetermined that the assembly time falls in the interval of (MIN_TA, LOW_TA) and the continuous times that the length threshold is not decreased is equal to a certain value, the probability for randomly decreasing the length threshold is 1. As the continuous times is increased from 0 to a predetermined value, the probability that the length threshold is decreased by one unit length is correspondingly increased from 0 to 1.

Figure 5:
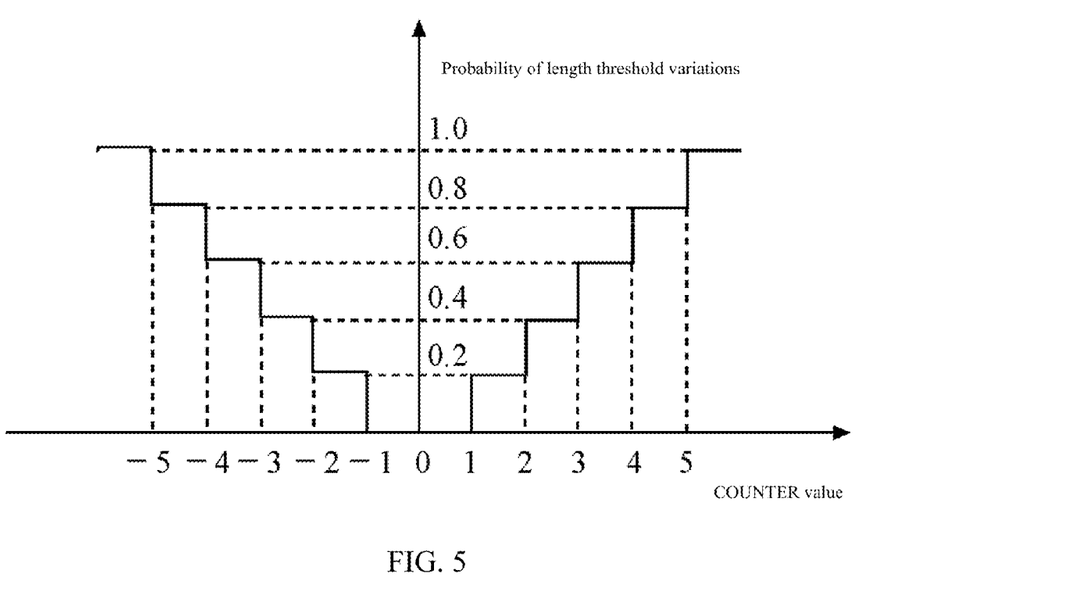
FIG. 5 is a schematic view of a relation between the continuous times that the length threshold is unadjusted and the adjustment probability when the load is to be increased or decreased according to an embodiment of the present invention.

Specific illustrations are provided below with the accompanying drawings. FIG. 5 is a schematic view of a relation between the continuous times that the length threshold is unadjusted and the randomly adjusted probability when the load is to be increased or decreased according to this embodiment. In FIG. 5, a horizontal axis COUNTER represents the continuous times that the length threshold is unadjusted when the load is to be increased or decreased, in which the forward direction represents the continuous times that the length threshold is not increased when the assembly time falls in the interval of (MIN_TA, LOW_TA), and the negative direction represents the continuous times that the length threshold is not decreased when the assembly time falls in the interval of (UP_TA, MAX_TA). A longitudinal axis represents the probability which is increased in a step-like form with the increase of an absolute value on the COUNTER. It should be noted that, in this embodiment, the probability may also use other values as long as the probability for adjusting the length threshold is increased with the increase of the absolute value on the COUNTER. Here, when the predetermined absolute value on the COUNTER is 5, the probability for adjusting the length threshold is 1. That is, when the assembly time falls in the interval of (MIN_TA, LOW_TA) or (MIN_TA, LOW_TA), and the continuous times that the length threshold is not correspondingly increased or decreased reaches 5 times, it can be determined that the load in the cache queue is to be stably increased or decreased so the length threshold needs to be immediately increased or decreased, i.e., the current probability for adjusting the length threshold is 1.

Further, the adjustment on the length threshold may not exceed the range of the predetermined value. If the length threshold has reached a predetermined upper limit or lower limit, even if the load is still to be increased or decreased, the length threshold may not be increased or decreased correspondingly.

In Step S411, the current length threshold is updated according to an adjustment result on the length threshold so as to serve as a current length threshold for a next burst assembly.

Seen from the above description of the technical solutions of the embodiment of the present invention, the time taken in the present embodiment for completing the assembly is used as a basis to determine the load change, and a threshold adjustment mechanism is adopted according to the trend of the load change. When the load slightly changes, it is determined randomly whether to adjust the length threshold or not through cumulative probability so as to avoid a dramatic continuous change of the length threshold. Besides, in the case of a load burst, a fast reaction is made immediately to adjust the length threshold in time.

Compared with the assembly method based on a fixed time threshold, the technical solutions according to the embodiments of the present invention better ensure the E2E delay, meanwhile decrease the data padding ratio under a low load, and improve the utilization of the burst packets. Besides, the technical solutions according to the embodiment of the present invention employ a random adjustment mechanism for the length threshold so as to effectively limit the cache usage and burst packet length under a high load and further decrease assembly synchronization, thereby improving the packet lost rate.

Compared with the assembly method based on a fixed length threshold, in the technical solutions according to the embodiment of the present invention, when the load slightly changes, the hysteresis adjustment characteristic of the length threshold is randomly adjusted according to a probability corresponding to the unadjusted continuous times so as to effectively stabilize the burst packet length and decrease the variation caused by the adjustment. Meanwhile, the technical solutions according to the embodiment of the present invention may effectively control the assembly delay under a low load and increase the length threshold under a high load, thereby preventing the burst packets from being generated too fast to some extent so as not to cause the blocking of the control channels.

Simulation results of OBS network performances obtained by different methods are compared below to further illustrate the effect of the present invention.

Figure 6:
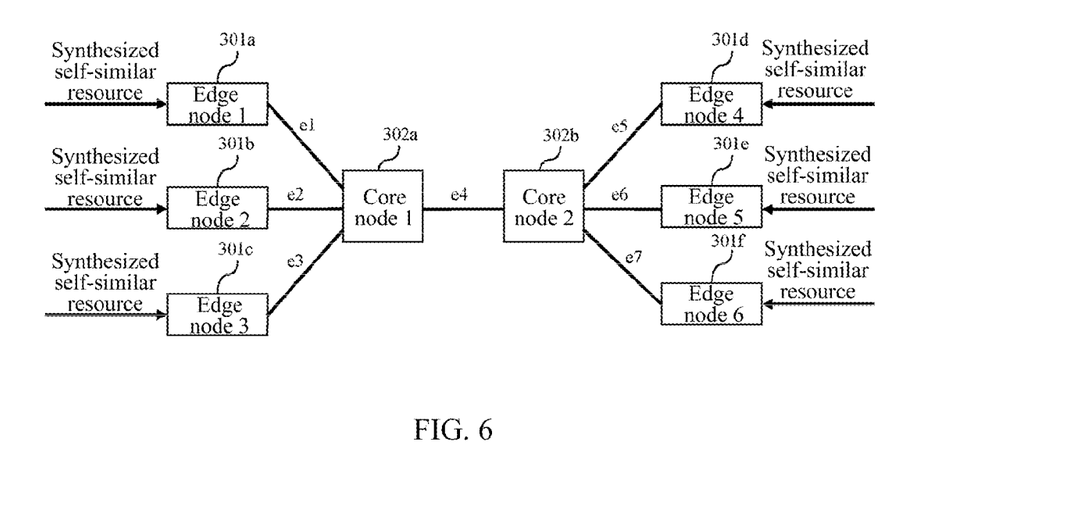
FIG. 6 is a schematic topological graph of a network simulation.

In order to verify the burst assembly method provided in the present invention, related simulation and comparison are performed. FIG. 6 is a schematic topological graph of a network simulation. Referring to FIG. 6, 301*a* to 301*f* are OBS network edge nodes, and 302*a*, 302*b* are core nodes. Traffic entering 301*a* to 301*f* is generated by a self-similar model so as to accurately simulate actual service conditions on the Internet. A method that provides a model for synthesizing self-similar service resources is disclosed in the conventional art. In the method, plenty of ON-OFF service resources are approximately synthesized into self-similar service resources. Each independent ON-OFF resource generates traffic at a constant rate during the ON period while does not generate any traffic during the OFF period. The ON and OFF periods appear alternately, and the time lengths thereof are distributed in the form of Pareto heavy-tailed distribution of the independent identical distribution. As plenty of ON-OFF resources are approximately synthesized into self-similar service resources, if a shape parameter of the Pareto distribution is "a", a Hurst parameter of a synthesized flow is $H=(3-a)/2$. The greater the H parameter, the higher the self-similarity. Forty (40) ON-OFF resources are synthesized into the required self-similar service resources and then sent to 301*a* to 301*f*. Moreover, the control on the average load is realized by altering the data rate during the ON period.

It is assumed that each fibre connected between egresses of the edge nodes and core nodes (e1 to e7 in FIG. 6) has four wavelength channels, and each wavelength channel has a rate of 1 Gbps/s. The data packet generated by each self-similar resource has a fixed length of 1250 bytes, and the destination address thereof follows a uniform distribution. The QoS is not considered at the moment. The average load is adjusted by altering the time interval for each ON-OFF resource to generate the IP packets. The load achieved when an average arriving rate of data from the egress of 302a to 302b is 3.6 Gbps/s serves as a load 1, according to which loads in other conditions are normalized. The lengths of the ON and OFF periods follow the Pareto distribution, and have a shape parameter a=1.2, so that the H parameter of the synthesized flow is approximately equal to 0.9. At a scheduling module of the edge nodes and the core nodes, the scheduling on the BHP adopts a latest available unscheduled channel with void filling (LAUC-VF) method, and thus the core nodes support a full-wavelength conversion.

Here, the assembly method based on a fixed time threshold is referred to as FT for short, the assembly method based on a fixed length is referred to as FL for short, the adaptive assembly method is referred to as ADA for short, and the burst assembly method provided by the present invention is referred to as IAAM-SED for short.

During the simulation process, parameters in each assembly method are set as follows. In the IAAM-SED, an upper limit and a lower limit of the length threshold are respectively 1600 kbits and 400 kbits, an adjustment step is 24 kbits, MAX_TA and MIN_TA are respectively 10 ms and 2 ms, when an adjustment probability is 1, a COUNTER value is set as 10, and UP_TA and LOW_TA are respectively 4.5 ms and 5.5 ms. In the ADA, BSmin and BSmax are also respectively 1600 kbits and 400 kbits, Lstep is 24 kbits, Tth is 10 ms, a comparison threshold of Num is also 10, and Ltol is 12 kbits. In the FT, a minimum burst packet length is 400 kbits, and a fixed assembly time threshold is 5 ms. In the FL, a fixed length threshold is 1000 kbits, which is an intermediate value for threshold adjustment between those of the IAAM-SED and ADA, and the time taken for completing the assembly on burst packets of this length under an average load of 0.5 is just 5 ms. Therefore, the parameter setting in the simulation comparison also concerns the fairness among these methods.

Figure 7:
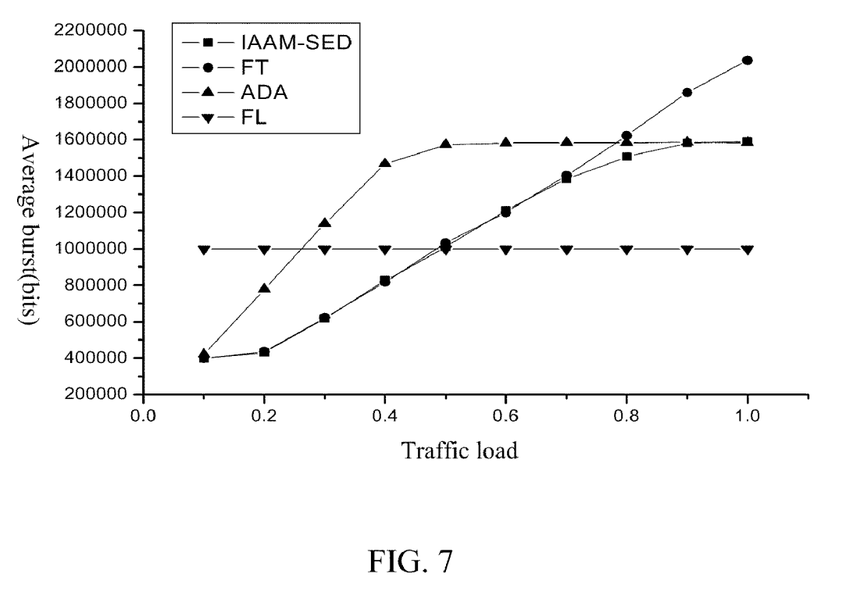
FIG. 7 is a schematic comparison diagram of burst packet lengths.

FIG. 7 is a schematic comparison diagram of burst packet lengths. In the ADA, as its adjustment mechanism cannot effectively control the threshold adjustment, a fixed long time threshold and an upper limit of the length threshold become termination conditions of the adjustment, and thus the upper limit of the length threshold is reached too early. However, in the IAAM-SED, the assembly delay is stabilized to enable the length threshold to vary with the load change in time so that it can be seen that the change of the burst packet length is almost identical to that of the FT, and meanwhile the setting of the length upper limit prevents an over-high requirement on the assembly cache.

Figure 8:
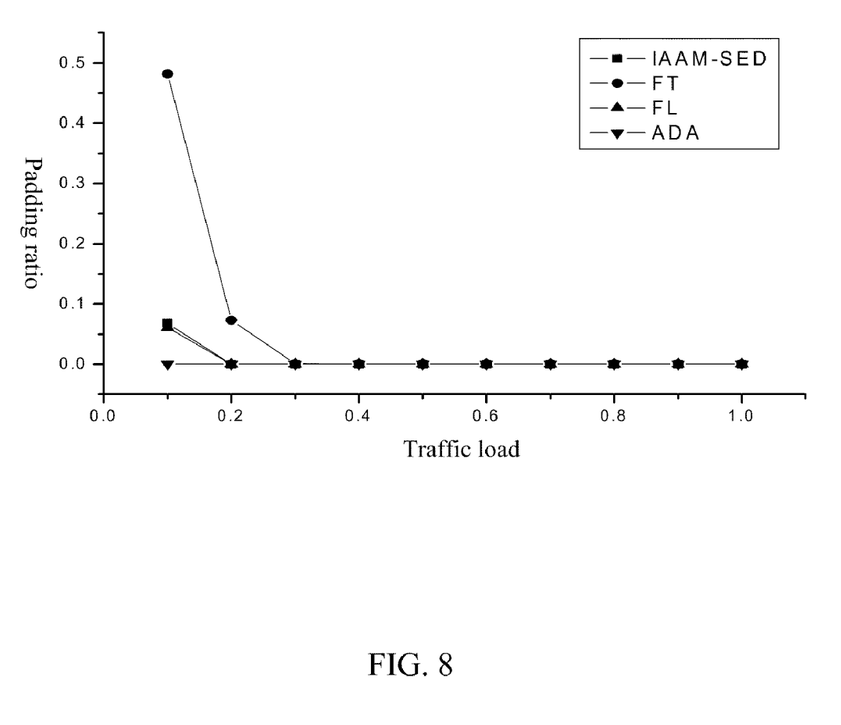
FIG. 8 is a schematic comparison diagram of padding ratios.

FIG. 8 is a schematic comparison diagram of padding ratios. Under a low load, in the FT, only a few data packets within a fixed time threshold enter the assembly queue, and thus plenty of blank data needs to be filled in to enable the burst packet length to reach the minimum requirement, thereby decreasing the utilization of the resources. In the IAAM-SED and ADA, not only the length threshold is adjusted to the minimum, but a long assembly time is provided within a tolerable range, so as to effectively decrease the padding ratio and improve the utilization efficiency of the resources.

After entering the assembly queue, the IP packets have to undergo an assembly delay, an offset time, a transmission queuing delay, a transmission delay, and a propagation delay, in which the propagation delay is related to a physical distance between the nodes while has a small impact on the comparison result in the embodiments of the present invention, and thus can be neglected. The transmission queuing delay means that, when the BHP is scheduled at an edge node, if the scheduling fails, the corresponding burst packet needs to be cached and thus delayed for a period of time before being scheduled. The duration of the offset time is related to a hop count between a resource node and a destination node, offset time=hop count×unit offset time, and the unit offset time is related to the processing speed of the BHP at the core node, which is uniformly set as 0.5 ms in simulation.

Figure 9:
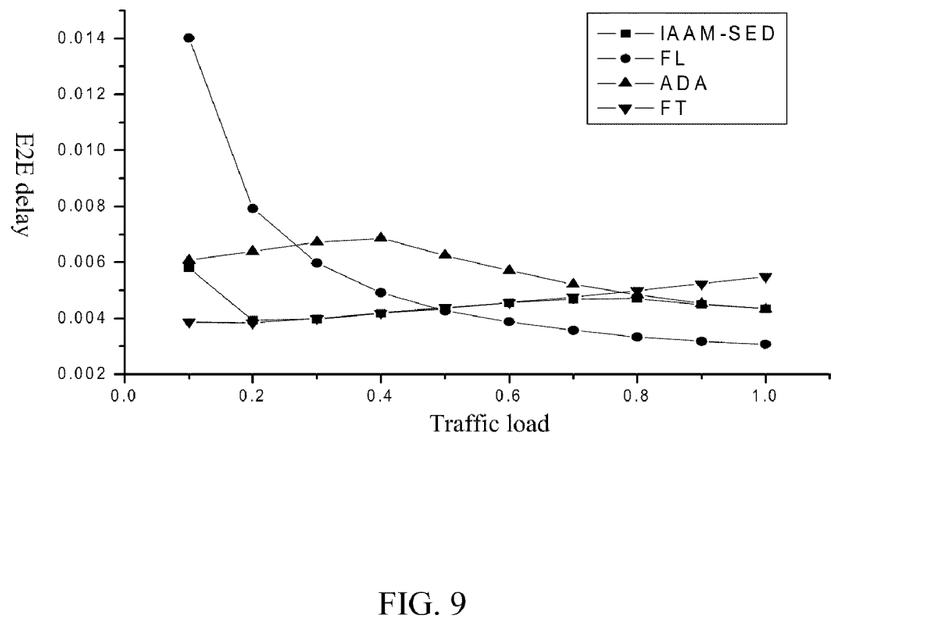
FIG. 9 is a schematic comparison view of E2E delays.

FIG. 9 is a schematic comparison view of E2E delays. In the FL, under a low load, a large delay is generated, and the main reason is that a large assembly delay is required to wait for the triggering of the length threshold. In the ADA, the delay performance is also not desirable, and the main reason is that the assembly delay is increased unnecessarily due to an over-sized length threshold. In the IAAM-SED, its delay control ability is almost the same as that of the FT, the whole control process is very smooth, and the delay is controlled around an optimal value. Besides, the delay performance of the IAAM-SED is even better than the FT under a high load, and the reason is that the assembly synchronization in the FT under a high load decreases the scheduling success ratio of the burst packets at the edge node, and plenty of burst packets need to undergo an additional transmission queuing delay, thus increasing the whole E2E delay. It should be noted that, when the load is 0.1, the delay of the IAAM-SED is greater than that of the FT, and the reason is that an over-low load may cause a fixed long time threshold to become a triggering condition for assembly, and though the delay is increased, on the other side, the data padding ratio is decreased.

Figure 10:
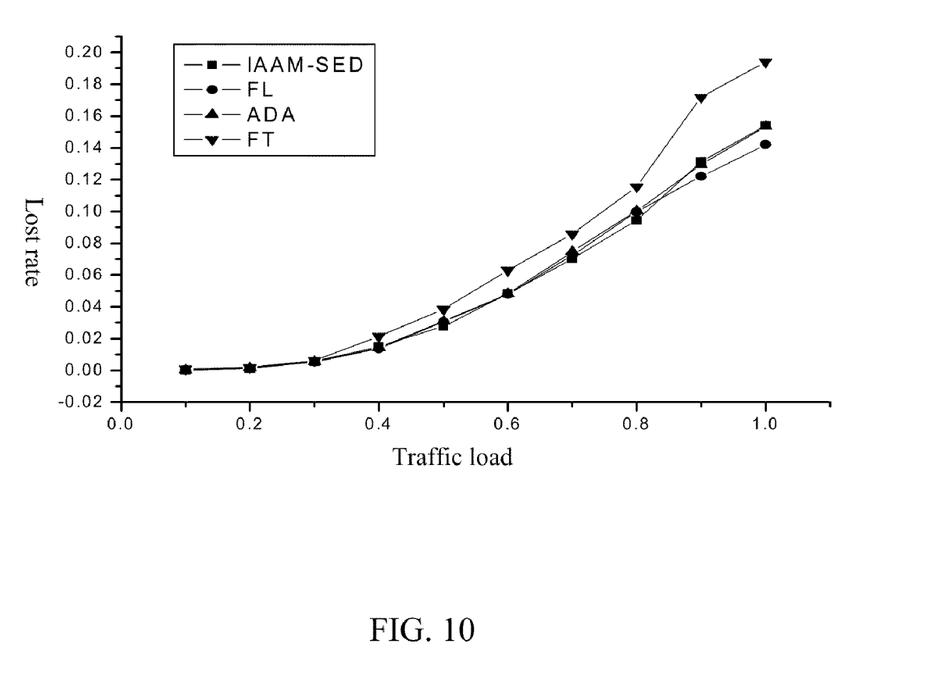
FIG. 10 is a schematic comparison view of packet lost rates of the IP packets.

FIG. 10 is a schematic comparison view of packet lost rates of the IP packets. Though the FT does well in delay control, its packet lost rate performance is the worst. No matter the load is high or low, the assembly synchronization of the FT will always cause a packet loss. Besides, when the load is high, once a long burst packet is lost, more IP packets will get lost. The IAAM-SED, ADA, and FL are all assembly methods based on a length threshold, and are all capable of eliminating the assembly synchronization in each queue, so their packet lost rates are small.

In view of the above, the technical solutions of the present invention do not have the defects of the existing assembly methods, is flexibly accommodated to various load changes, assembles with an optimal threshold, and is desirable in every performance index.

Based on the same principle as the aforementioned method for controlling burst assembly, the present invention further discloses a device for controlling assembly and a corresponding communication equipment. It should be noted that, as the device embodiments abide by the same principle as the method embodiment, they have many identical or corresponding technical characteristics which will be simply discussed without detailed description.

Figure 11:
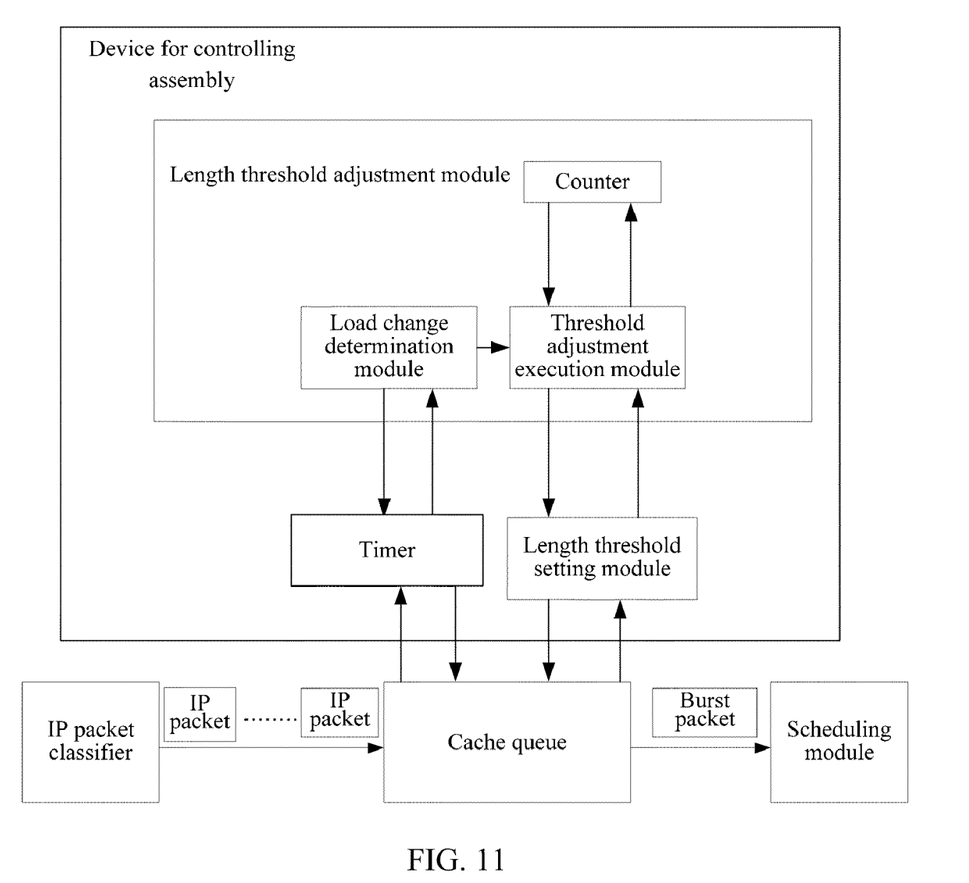
FIG. 11 is a schematic structural view of the device for controlling assembly according to an embodiment of the present invention.

FIG. 11 is a schematic structural view of a device for controlling assembly according to an embodiment of the present invention. Referring to FIG. 11, the device includes a timer, a length threshold setting module, and a length threshold adjustment module.

The timer is adapted to time a current waiting time for IP packets in a corresponding cache queue. When the waiting time of the IP packets in the cache queue exceeds a predetermined maximum assembly delay, the timer sends a trigger assembly signal to the cache queue to instruct the cache queue to assemble the cached data packets into a burst packet to be sent out, and then resets.

The length threshold setting module is adapted to set and store a current length threshold, and compare a current value of the total length of the IP packets in the received cache queue with the current length threshold. If the value is greater than the current length threshold, the module sends an assembly trigger signal to the cache queue so as to instruct the cache queue to assemble the stored IP packets into a burst packet.

The length threshold adjustment module is adapted to dynamically adjust the length threshold according to a load change. The length threshold adjustment module specifically includes a load change determination module, a threshold adjustment execution module, and a counter. The dynamic adjustment of the length threshold according to the load change by each module is further illustrated below.

When an IP packet enters a cache queue, the cache queue updates the queue length and sends the updated queue length to the length threshold setting module. When the queue length reaches a current length threshold, the length threshold setting module sends a trigger assembly signal to the cache queue. After receiving the signal, the cache queue assembles all the IP packets into a burst packet to be sent out, then restores the total length of the IP packets to zero, and informs the timer to reset. Before resetting, the timer sends a current assembly time to the load change determination module. The load change determination module determines the current load change situation in the cache queue, and sends the determination result to the threshold adjustment execution module. The basis of the load change determination made by the load change determination module has already been given in detail in the flow of the method, which will not be described herein again. The trend of the load change includes the following cases.

When the assembly time falls in a tolerable assembly delay range, i.e., the load slightly changes, the current length threshold will not be adjusted.

When the assembly time falls in an interval of (0, MIN_TA) or reaches MAX_TA, i.e., a load burst appears, the threshold adjustment execution module informs the length threshold setting module to add or reduce the length threshold by one predetermined unit length, and then instructs the counter to reset.

When the assembly time falls in an interval of (MIN_TA, LOW_TA), i.e., the load is to be increased, the threshold adjustment execution module instructs the counter to add a COUNTER value by 1. The counter executes the instruction from the threshold adjustment execution module, and then feeds back the COUNTER value to the threshold adjustment execution module.

When the assembly time falls in an interval of (UP_TA, MAX_TA), i.e., the load is to be decreased, the threshold adjustment threshold execution module instructs the counter to reduce the COUNTER by 1. The counter executes the instruction from the threshold adjustment execution module, and then feeds back the COUNTER value to the threshold adjustment execution module.

The threshold adjustment execution module determines randomly whether to increase or decrease the length threshold by one predetermined unit length according to a probability determined by the COUNTER value. After making an adjustment determination on the length threshold, the threshold adjustment execution module informs the counter to reset to zero, and instructs the length threshold setting module to update and store the current length threshold according to the adjustment result. The length threshold setting module updates and stores the current length threshold, and the adjusted length threshold serves as a current length threshold for a next burst assembly.

Correspondingly, an embodiment of the present invention further discloses a communication equipment serving as an edge node of an OBS network. The equipment includes a data packet classifier, a plurality of cache queues, a plurality of device for controlling assembly, and a scheduling module.

The data packet classifier classifies data packets according to destination addresses and/or priorities thereof, and then sends the data packets to the corresponding cache queues.

The cache queue receives the data packets, updates current queue length, and sends the current queue length to the corresponding device for controlling assembly.

The device for controlling assembly controls whether to assemble the data packets in the cache queue into a burst packet to be sent out according to a predetermined maximum assembly delay and a current length threshold, and compares an assembly time with a predetermined time threshold to determine a load change in the cache queue.

If the load is to be increased and the number of the continuous times that the length threshold is not increased when the load is to be increased is greater than or equal to a predetermined value, the device for controlling assembly adds the length threshold, and updates the current length threshold.

If the load is to be decreased and the number of the continuous times that the length threshold is not decreased when the load is to be decreased is greater than or equal to a predetermined value, the device for controlling assembly reduces the length threshold, and updates the current length threshold.

The scheduling module adopts a scheduling strategy to schedule the burst packets sent from the cache queue to an appropriate channel for transmission.

It will be apparent to those skilled in the art that various modifications and variations can be made to the present invention without departing from the scope of the invention. In view of the foregoing, it is intended that the present invention cover modifications and variations of this invention provided that they fall within the scope of the following claims and their equivalents.

What is claimed is:

1. A method for controlling a burst assembly, comprising:
   judging at least one of the following situations: (a) whether a data packet cache time in a cache queue reaches a predetermined maximum assembly delay or not, (b) whether a total length of data packets in the cache queue reaches a length threshold;
   assembling all the data packets in the cache queue into a burst packet to be sent out if either of the two judgment conditions is satisfied; and
   comparing an assembly time with a predetermined time threshold and determining a change trend of a load in the cache queue, wherein comparing the assembly time with the predetermined time threshold and determining the load change trend in the cache queue specifically comprises:
   judging whether the assembly time is greater than a predetermined minimum assembly delay while smaller than a tolerable minimum delay, and if the assembly time is greater than the predetermined minimum assembly delay while smaller than the tolerable minimum delay, determining that the load in the cache queue is to be increased; and
   judging whether the assembly time is greater than a tolerable maximum assembly delay while smaller than the predetermined maximum assembly delay, and if the assembly time is greater than the tolerable maximum assembly delay while smaller than the predetermined maximum assembly delay, determining that the load in the cache queue is to be decreased;
   if the load is to be increased, judging whether an amount of continuous times that the length threshold is not increased is greater than or equal to a predetermined value, and if the amount of the continuous times that the length threshold is not increased is greater than or equal to the predetermined value, increasing the length threshold; and if the load is to be decreased, judging whether an amount of continuous times that the length threshold is not decreased is greater than or equal to a predetermined value, and if the amount of the continuous times that the length threshold is not decreased is greater than or equal to the predetermined value, decreasing the length threshold.

2. The method according to claim 1, further comprising:
if the load is to be increased and the continuous times that the length threshold is not increased is smaller than the predetermined value, determining randomly whether to increase the length threshold or not according to a probability corresponding to the continuous times, wherein the probability increases with the increase of the continuous times that the length threshold is not increased; and if the load is to be decreased and the continuous times that the length threshold is not decreased is smaller than the predetermined value, determining randomly whether to decrease the length threshold or not according to a probability corresponding to the continuous times, wherein the probability increases with the increase of the continuous times that the length threshold is not decreased.

3. The method according to claim 1, further comprising:
if the assembly time is smaller than the minimum delay or equal to a maximum delay, increasing or decreasing the load in the cache queue suddenly; and neglecting a relation between the continuous times that the length threshold is unchanged and the predetermined value, and directly increasing or decreasing the length threshold correspondingly.

4. The method according to claim 3, further comprising:
judging the assembly time is greater than the tolerable minimum assembly delay and smaller than the tolerable maximum assembly delay;
determining that the load in the cache queue is normal, wherein the tolerable maximum assembly delay and the tolerable minimum assembly delay are predetermined according to service requirements; and
maintaining the length threshold.

5. The method according to claim 1, further comprising:
judging the assembly time is greater than the tolerable minimum assembly delay and smaller than the tolerable maximum assembly delay;
determining that the load in the cache queue is normal, wherein the tolerable maximum assembly delay and the tolerable minimum assembly delay are predetermined according to service requirements; and
maintaining the length threshold.

6. The method according to claim 1, wherein after judging whether the data packet cache time in the cache queue reaches the predetermined maximum assembly delay or not and before assembling all the data packets in the cache queue into the burst packet to be sent out, the method further comprises:
judging the data packets in the cache queue is smaller than the predetermined minimum queue length; and
filling bytes into the cache queue to reach the minimum queue length.

7. The method according to claim 1, further comprising adjusting the length threshold to be greater than a predetermined minimum length threshold and smaller than a predetermined maximum length threshold.

8. A device for controlling assembly, comprising:
a timer, adapted to time a cache time for data packets in a cache queue, and send a trigger assembly signal to the cache queue when the cache time reaches a predetermined maximum assembly delay so as to instruct the cache queue to assemble all the data packets into a burst packet to be sent out;
a length threshold setting module, adapted to set and store a length threshold, and send a trigger assembly signal to the cache queue, when a queue length reported by the cache queue reaches the length threshold, to instruct the cache queue to assemble all the data packets into a burst packet to be sent out; and
a length threshold adjustment module, adapted to compare an assembly time reported by the timer with a predetermined time threshold and determine a change trend of a load in the cache queue, wherein:
the length threshold adjust module judges whether the assembly time is greater than a predetermined minimum assembly delay while smaller than a tolerable minimum delay, and if the assembly time is greater than the predetermined minimum assembly delay while smaller than the tolerable minimum delay, determines that the load in the cache queue is to be increased; and
the length threshold adjust module judges whether the assembly time is greater than a tolerable maximum assembly delay while smaller than the predetermined maximum assembly delay, and if the assembly time is greater than the tolerable maximum assembly delay while smaller than the predetermined maximum assembly delay, determines that the load in the cache queue is to be decreased:
if the load is to be increased and an amount of continuous times that the length threshold is not increased is greater than or equal to a predetermined value, the length threshold adjustment module increases the length threshold and instructs the length threshold setting module to update the length threshold stored in the threshold setting module; and
if the load is to be decreased and an amount of continuous times that the length threshold is not decreased when the load is to be decreased is greater than or equal to a predetermined value, the length threshold adjustment module decreases the length threshold and instructs the length threshold setting module to update the length threshold stored in the threshold setting module.

9. The device according to claim 8, wherein the length threshold adjustment module comprises:
a counter for counting a current count value;
a load change determination module, adapted to compare the assembly time reported by the timer with the predetermined time threshold, determine the change trend of the load in the cache queue, and send out a determination result; and
a threshold adjustment execution module, adapted to:
receive the determination result from the load change determination module;
adjust the counter by one (1) based on the change trend of the load;
adjust the length threshold; and
instruct the length threshold setting module to update the length threshold stored in the threshold setting module based on the current count value from the counter and a predetermined value.

10. The device according to claim 9, wherein the threshold adjustment execution module is further adapted to:

determine randomly whether to increase the length threshold or not according to a probability corresponding to the count value when the load is to be increased and a current count value fed back by the counter is positive and smaller than a predetermined value; and determine randomly whether to decrease the length threshold or not according to the probability corresponding to the count value when the load is to be decreased and the current count value fed back by the counter is negative and an absolute value thereof is smaller than the predetermined value.

11. The device according to claim 10, wherein the threshold adjustment execution module is further adapted to:

instruct the counter to reset back to zero after adjusting the length threshold.

12. The device according to claim 9, wherein the threshold adjustment execution module is further adapted to:

instruct the counter to reset back to zero after adjusting the length threshold.

13. The device according to claim 9, wherein the threshold adjustment execution module instructs the counter to increase by one when the load is to be increased, and increases the length threshold and instruct the length threshold setting module to update the length threshold when a current count value fed back by the counter is positive and is greater than or equal to a predetermined value.

14. The device according to claim 9, wherein the threshold adjustment execution module instructs the counter to decrease by one when the load is to be decreased, and decreases the length threshold and instruct the length threshold setting module to update the length threshold when a current count value fed back by the counter is negative and an absolute value thereof is greater than or equal to a predetermined value.

15. A communication equipment serving as an edge node in an optical burst network, comprising:

a data packet classifier adapted to classify data packets according to at least one of the following: (a) destination addresses, (b) priorities thereof, and send the data packets;

a cache queue adapted to update a current queue length after receiving the corresponding data packets from the data packet classifier, and send the current queue length; and a device adapted to receive the corresponding current queue length, control whether to assemble the data packets in the cache queue into burst packets to be sent out according to a predetermined maximum assembly delay and a length threshold, compare an assembly time with a predetermined time threshold, and determine change trends of a load in the cache queue:

the device judges whether the assembly time is greater than a predetermined minimum assembly delay while smaller than a tolerable minimum delay, and if the assembly time is greater than the predetermined minimum assembly delay while smaller than the tolerable minimum delay, determines that the load in the cache queue is to be increased;

the device judges whether the assembly time is greater than a tolerable maximum assembly delay while smaller than the predetermined maximum assembly delay, and if the assembly time is greater than the tolerable maximum assembly delay while smaller than the predetermined maximum assembly delay, determines that the load in the cache queue is to be decreased;

if the load is to be increased and an amount of continuous times that the length threshold is not increased is greater than or equal to a predetermined value, the device for controlling assembly increases the length threshold and update the length threshold; and if the load is to be decreased, and the amount of the continuous times that the length threshold is not decreased when the loads are to be decreased is greater than or equal to a predetermined value, the device for controlling assembly decreases the length threshold and updates the length threshold; and a scheduling module adapted to adopt a scheduling strategy to schedule the burst packets sent by the cache queues to appropriate channels for transmission.

\* \* \* \* \*